United States Patent

Ehrig

[11] Patent Number: 5,735,123
[45] Date of Patent: Apr. 7, 1998

[54] ENERGY GENERATING SYSTEM

[75] Inventor: Dietrich Ehrig, Grasberg, Germany

[73] Assignee: Daimler-Benz Aerospace Airbus GmbH, Hamburg, Germany

[21] Appl. No.: 635,939
[22] PCT Filed: Oct. 25, 1994
[86] PCT No.: PCT/DE94/01252
§ 371 Date: Apr. 26, 1996
§ 102(e) Date: Apr. 26, 1996
[87] PCT Pub. No.: WO95/12065
PCT Pub. Date: May 4, 1995

[30] Foreign Application Priority Data

Oct. 29, 1993 [DE] Germany ............ 43 36 975.8

[51] Int. Cl.$^6$ ............................................. F02G 1/04
[52] U.S. Cl. ................................... 60/525; 60/517
[58] Field of Search ................... 60/517, 525, 641.8, 60/641.15; 62/6

[56] References Cited

U.S. PATENT DOCUMENTS 3,277,743 10/1966 Kell.
4,642,988 2/1987 Benson ........................ 60/525
4,677,825 7/1987 Fellows ........................ 60/525
5,404,723 4/1995 Parker et al. .................. 60/641.15

FOREIGN PATENT DOCUMENTS 875110 8/1952 Germany.
3723950 8/1988 Germany.

Primary Examiner—Ira S. Lazarus
Assistant Examiner—Alfred Basichas
Attorney, Agent, or Firm—W. G. Fasse; W. F. Fasse

[57] ABSTRACT

In an energy generating system, which is preferably suitable for satellites and space stations, a total of four Stirling engines are assembled together into a cross-shaped unit, at the center of which is arranged a cross-gear drive that is acted upon by the pistons of the Stirling engines. The heaters of the Stirling engines are impinged upon by solar energy. The incident sun's rays either are guided by a radiation trap that is arranged in the center of a collector onto an umbrella-shaped tubular heating heat exchanger, or are absorbed by disk collectors that are arranged inside a fusion heat reservoir.

20 Claims, 5 Drawing Sheets

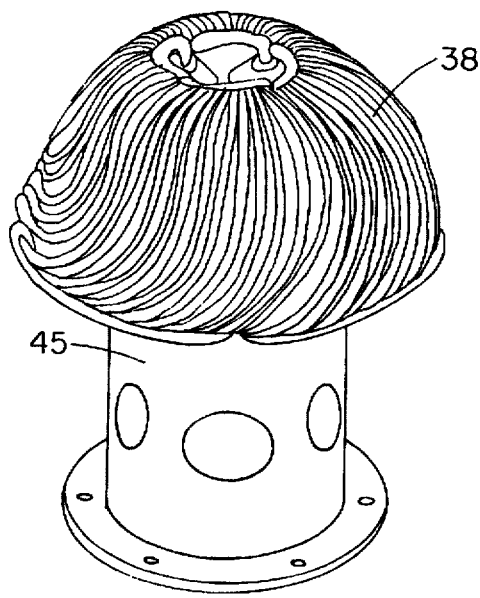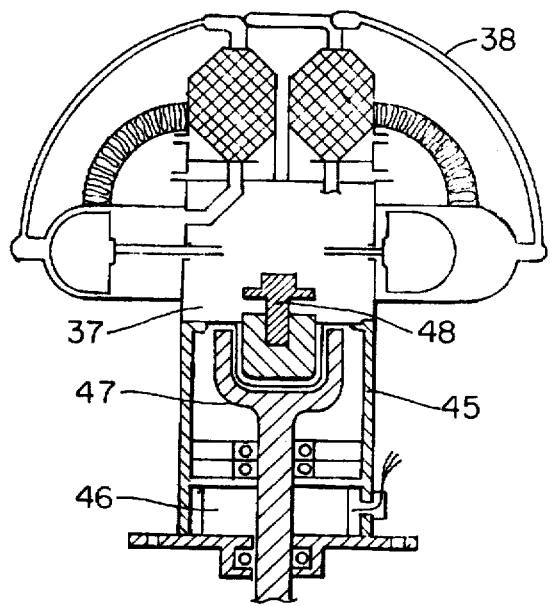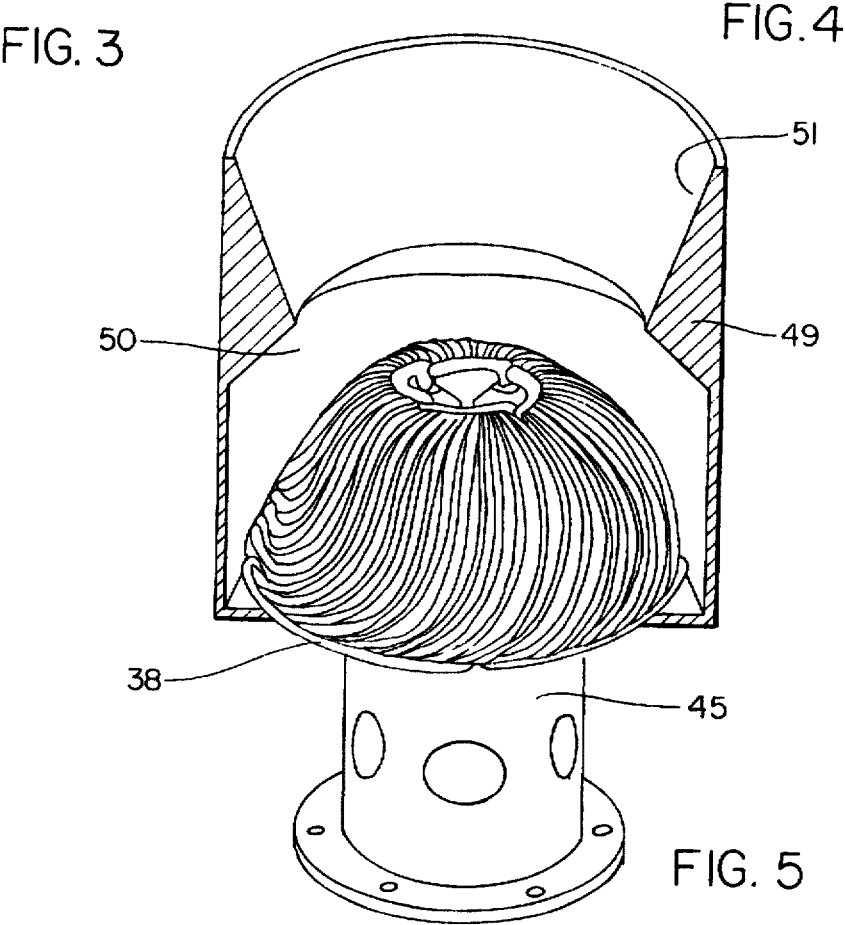
FIG. 3
FIG. 4
FIG. 5

ENERGY GENERATING SYSTEM

CROSS-REFERENCE TO RELATED APPLICATION

This application is related to my copending application U.S. Ser. No. 08/635,940, PCT/DE94/01250, entitled "Energy Generating System", filed on Apr. 26, 1996.

BACKGROUND INFORMATION

The invention relates to an energy generating system, especially for satellites and space stations, based on Stirling engines.

Engines operating according to the Stirling-cycle process have long been known. Just as for Diesel and Otto engines, the operating principle thereof is based on a working gas being compressed at a low temperature and then being expanded at a high temperature. In contrast to the two latter mentioned engines however, the working gas in a Stirling engine is not heated by an internal combustion, but rather the heat is continuously provided to the working gas from outside. For that reason, temperature differences in nearly any desired range can be converted into mechanical work with the Stirling engine.

Originally, the Stirling engine was embodied as a single cylinder engine with two loaded pistons, and later was predominantly used in the so-called V-arrangement in which a displacer was arranged in one cylinder and a piston was arranged in a second cylinder. Thereafter, in more recent times, so-called double-acting Stirling engines have come into use, in which, for example four cylinders operate with a suitable phase shift one after another. Each of the cylinders in the latter mentioned arrangement has only one piston, which simultaneously serves as a displacer for the following piston. Components common to all Stirling engines are the heater, the regenerator, and the cooler, which are arranged between the displacer and the piston in the V-arrangement, and which are arranged respectively between the individual cylinders in the double-acting Stirling engine.

Stirling engines are generally driven by a constantly burning flame, for which the most varied fuels are used. It has also already been sporadically suggested to drive Stirling engines with solar energy, and use these for sea water desalination, for example. In addition to the already mentioned advantage of being able to use any desired temperature interval for the generation of mechanical work, Stirling engines are distinguished by a high efficiency, an advantageous torque characteristic over the range of operating rotational speeds, as well as a vibration-free operation.

Despite these clearly evident advantages, the field of use of Stirling engines is still very limited. Thus, in satellites and space stations, photovoltaic energy generating systems are predominantly used at the present time, even though the energy yield that can be obtained therewith is comparatively small. Especially in future space stations, the energy demands will be so high, that it will be scarcely possible to cover the demand through photovoltaic means.

SUMMARY OF THE INVENTION

It is the object of the invention to provide an energy generating system based on the Stirling hot air engine, that is suitable both for terrestrial applications, but especially also for use in orbital stations. Further objects of the invention are to overcome the disadvantages discussed above and achieve the advantages discussed below.

The invention achieves these objects by means of an energy generating system using a Stirling engine coupled with an apparatus for absorbing radiant heat. Advantageous further details of the energy generating system according to the invention include the following. Preferably the apparatus for absorbing radiant heat is formed by the heaters of the Stirling engines combined together into a tubular heating heat exchanger that is impinged upon by radiant energy. The individual tubes of the tubular heat exchanger form a swirl-flow generating arrangement, and the heat exchanger is spherically formed and surrounds the Stirling engines in an umbrella-like manner. Alternatively, the heaters of the Stirling engines are connected with disk collectors that surround the Stirling engines in a cone shape. The system can further include a funnel-shaped radiation trap, a collector dish, or a fusion heat reservoir arranged to cooperate with the heat exchanger. The Stirling engines are preferably coupled to a cross-gear drive arrangement.

Thus, the cross-gear drive arrangement with mass balancing provided in the preferred embodiment of the invention achieves an extremely easy construction of the apparatus. Since no first and second order mass forces become effective in this drive arrangement, the energy generating system according to the invention comprises a minimum of vibrations.

Moreover, since the entire system can be constructed in a completely encapsulated manner, the working gas pressures of typically more than 10 MPa (with the working gas preferably being helium or hydrogen) do not need to be sealed relative to the surrounding environment. Thus, a pressure prevails in the drive that is between the pressure during the compression stroke and the pressure during the working stroke. Since only the differences arising between this intermediate pressure and the compression pressure or the working pressure need to be sealed, the wear arising on the piston rings, or rather the wear caused by the piston rings on the contact surfaces is extremely small. Therefore, the energy generating system according to the invention is practically maintenance free and is distinguished by a long operating lifetime.

The further detailed embodiment of the invention provides a heat exchanger system that is thermodynamically optimized due to the swirl flow caused in the heating tubes or due to the suitably fitted radiation surface disks with a small radiating volume. With this heat exchanger system, only a small dead volume is present in the heating gas region, whereby a corresponding high efficiency is ensured.

BRIEF DESCRIPTION OF THE DRAWINGS

Example embodiments of the invention are schematically shown in the drawings wherein:

FIGS. 3 shows a perspective view of a complete energy generating system based on the arrangement of FIG. 2;

FIG. 4 is a sectional view of the system of FIG. 3;

FIG. 5 shows the arrangement according to FIG. 3 with an additional radiation trap shown in section;

DETAILED DESCRIPTION OF PREFERRED EXAMPLE EMBODIMENTS AND OF THE BEST MODE OF THE INVENTION

Figure 1:
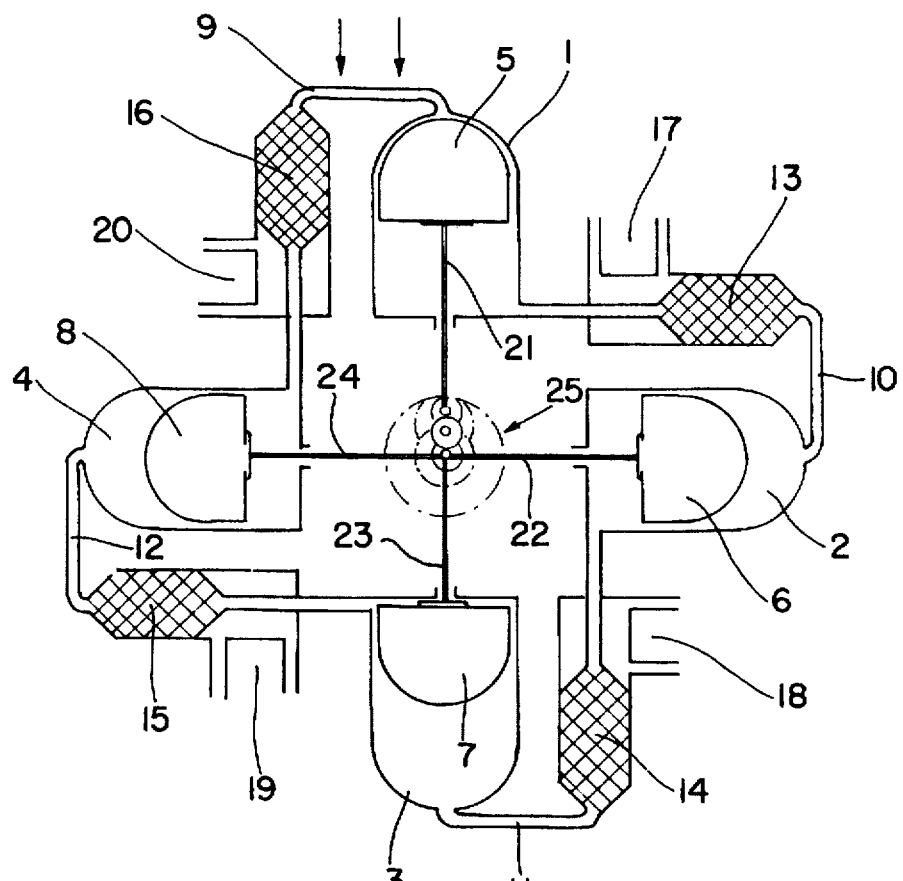
FIG. 1 shows a horizontal section through a Stirling engine with four cylinders.
Figure 2:
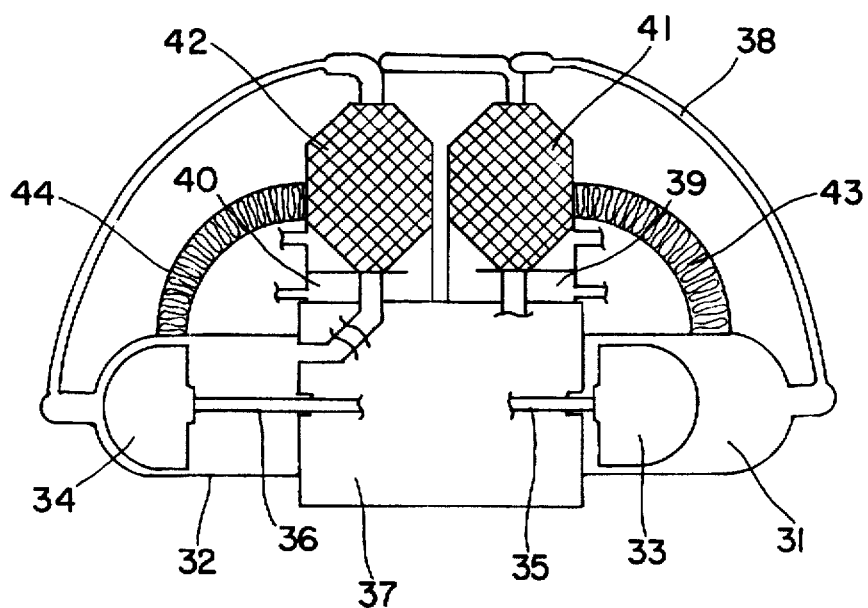
FIG. 2 shows a vertical section through a part of an energy generating system based on the arrangement shown in FIG. 1.

The arrangement according to FIG. 1 relates to the schematic view of a double-acting Stirling engine with four cylinders 1 to 4, which work with a phase shift of respectively 90° one after another. In each of the cylinders 1 to 4, a piston 5 to 8 is arranged, which simultaneously functions as a displacer for the following cylinder. Between every two respective successive cylinders, a heater 9 to 12, a regenerator 13 to 16, and a cooler 17 to 20 are respectively arranged. Finally, each of the pistons 5 to 8 is connected by a piston rod 21 to 24 to a cross-gear drive 25.

The energy required for performing mechanical work is provided to the working gas, which is hydrogen or helium in the case of the presently described example embodiment, by means of radiant heat in the area of the heaters 9 to 12, as is shown by arrows for the heater 9 in FIG. 1. In this context, the respective side of the cylinder 1 to 4 directed toward the heater 9 to 12 is the hot side, while the side directed toward the cooler 17 to 20 is the cold side. The working gas is respectively pushed cyclically back and forth between two successive pistons.

The regenerators 13 to 16 arranged respectively between each of the coolers 17 to 20 and the associated heater 9 to 12 serve as short-term heat reservoirs or absorbers. On the one hand, these heat reservoirs remove heat from the working gas flowing out of the hot region of the cylinders, so that this removed heat is not completely lost as rejected heat in the cooler. On the other hand, these heat reservoirs give off the stored heat to the working gas flowing into the hot region, and thereby already heat-up the working gas before it reaches the heater. In the example embodiments described here, the regenerators 13 to 16 (or the corresponding regenerators in the arrangement described below) are thermodynamically optimized by minimizing the flow losses and dead volumes as well as by maximizing their heat storage capacity, so that they make it possible to achieve high efficiencies of the respective energy generating systems. The removal of the lost heat from the coolers 17 to 20 is achieved by so-called heat pipes, which are not shown in the figures.

As a result of the cross-shaped arrangement of the four cylinders 1 to 4 with the cross-gear drive 25, there arises a sinusoidally progressing characteristic of the rotating mass forces with a substantially uniform progress characteristic of the torque moment for each 360° rotation. Therefore, in this arrangement, the use of an energy robbing flywheel can be avoided.

The arrangement shown in various views in FIGS. 2 to 6 comprises the same principle construction as already described in conjunction with FIG. 1. Thus, the arrangement again comprises four cylinders arranged in a cross-shape, of which only the two cylinders 31 and 32 are visible in FIG. 2. Pistons 33 and 34 run in the two cylinders 31 and 32 and act via piston rods 35 and 36 on a cross-gear drive arranged in a housing 37. In this example embodiment, the heaters are combined together to form an umbrella-like or bowl-shaped tubular heating heat exchanger 38, as can be seen especially in the perspective views of FIGS. 3 and 5. A respective cooler 39, 40 and a regenerator 41, 42 are provided underneath the tubular heating heat exchanger 38 for each cylinder 31, 32. Moreover, a spherically shaped insulating layer 43, 44 is respectively arranged between each cylinder 31, 32 and the associated regenerator 41, 42, in order to thermally decouple the cold side of the cylinder 31, 32 from the regenerator 41, 42.

In FIGS. 3 and 4 it can be seen that a further housing 45 extends from the housing 37 in which the cross-gear drive is arranged. A generator 46 is located in the further housing 45 and is connected via a magnetic coupling 47 to the output shaft 48 of the cross-gear drive, which is not shown in the figures. FIG. 4 simultaneously shows the modular construction of the entire arrangement. Furthermore, in this figure, the gas-tight encapsulation of the actual Stirling engine can be seen, wherein, for example, an electrical coupling may of course be used instead of the permanent magnet coupling that is shown here. Finally, it is especially evident in FIG. 3, that the contour of the individual tubes in the tubular heating heat exchanger 38 is formed in such a manner so as to give rise to a swirl generation with a build-up of a turbulent flow pattern in the working gas, whereby a maximum heat absorption is ensured.

Figure 6:
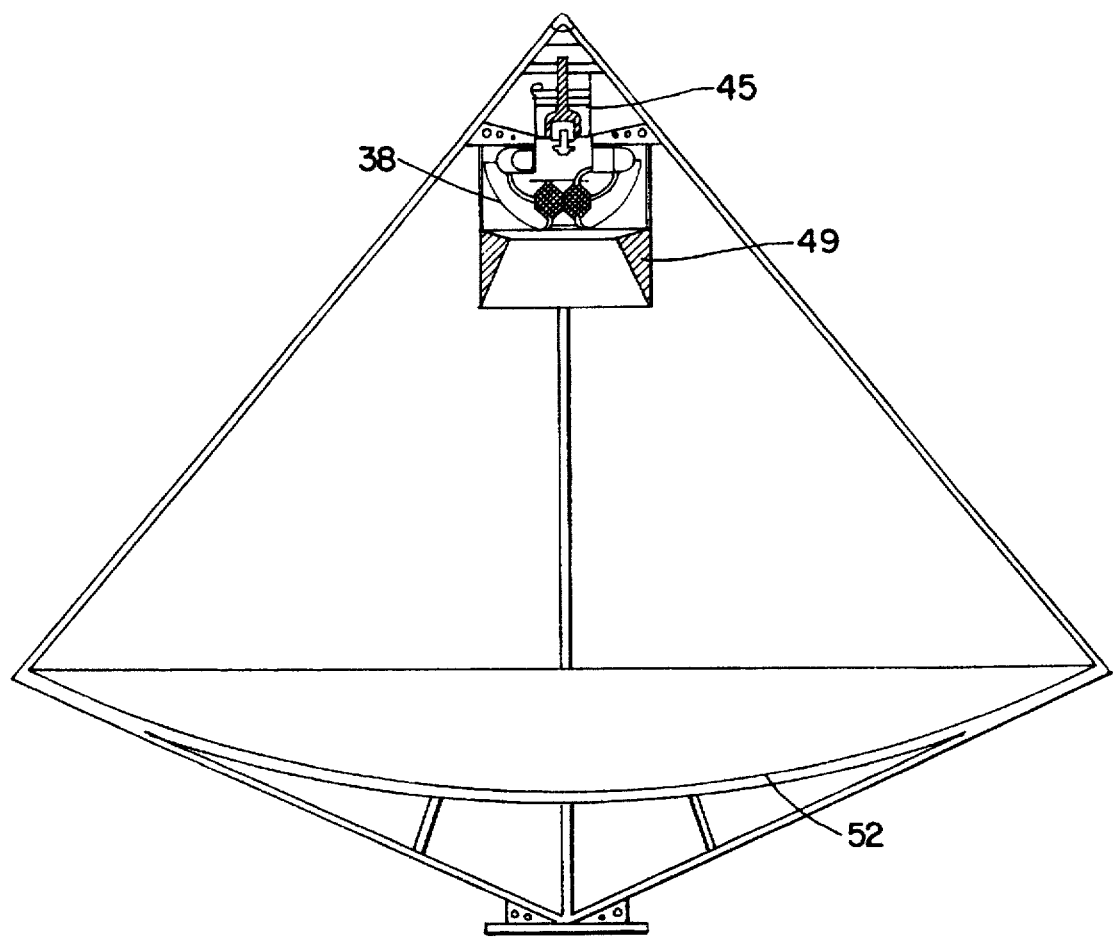
FIG. 6 shows the arrangement of FIG. 5 with an additional solar collector.
Figures 7, 8:
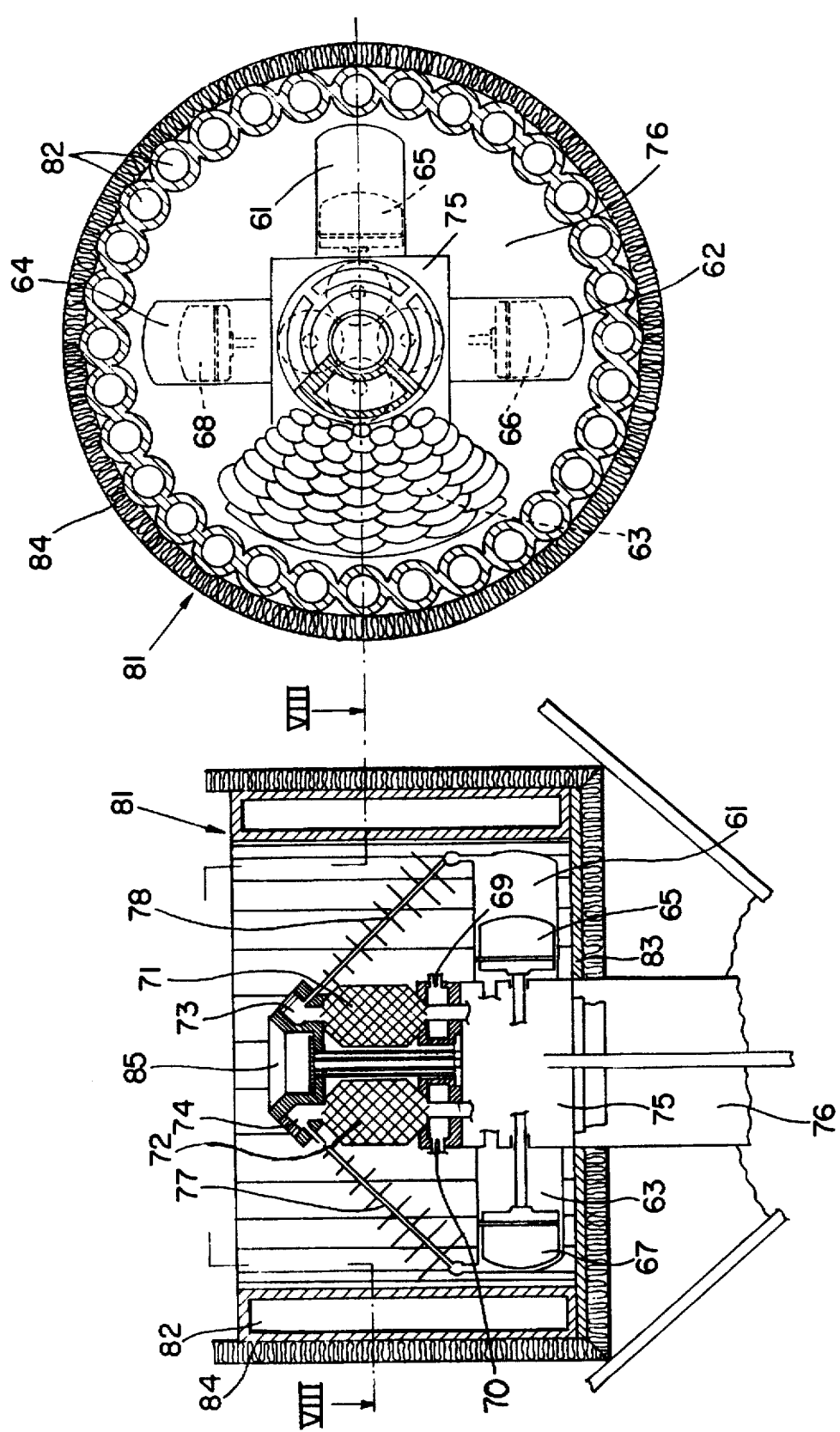
FIG. 7 shows a section taken on an axial plane through another embodiment of an energy generating system of the invention, using disk collectors.
FIG. 8 shows a section taken on a radial plane identified by the line VIII—VIII in FIG. 7.

Furthermore, in order to increase the achievable energy yield, a radiation trap 49 which surrounds the tubular heating heat exchanger 38 is provided as shown in FIG. 5. The radiation trap 49 has a cylindrical outside shape and comprises in its interior a funnel-shaped opening 50 directed toward the tubular heating heat exchanger 38. The wall surface 51 of this opening 50 is mirrored. Finally, as shown in FIG. 6, the entire arrangement is mounted at the center of a spherically curved concentrator 52, of which the inner surface is similarly mirrored. The concentrator 52 serves to bundle the incident sun's rays into a beam directed onto the tubular heating heat exchanger 38.

Figure 9:
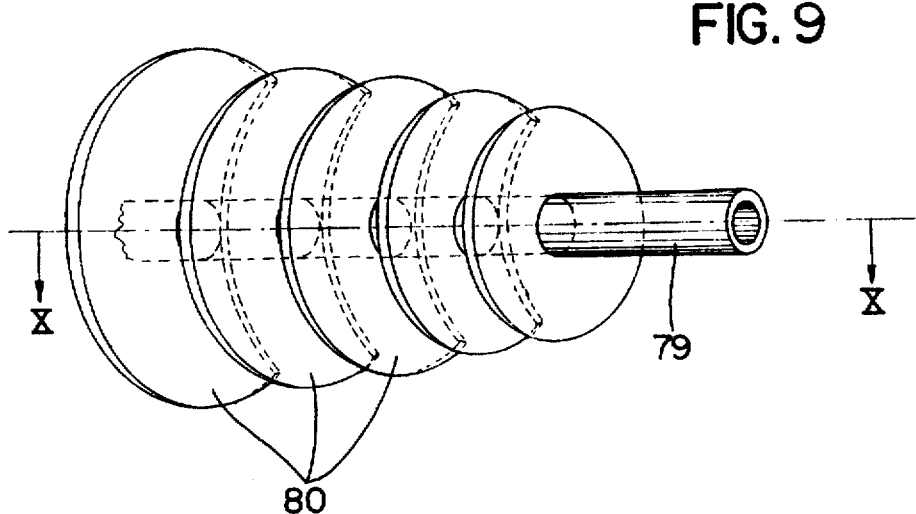
FIG. 9 is a detail view of a single disk collector of the system of FIGS. 7 and 8.
Figure 10:
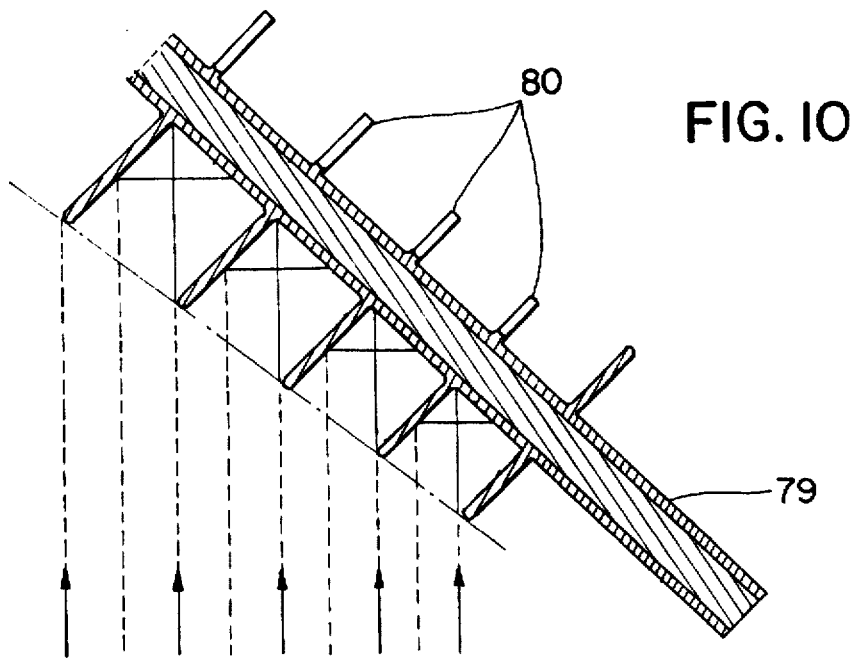
FIG. 10 is an axial section through the disk collector of FIG. 9.

FIGS. 7 to 10 show details of a second energy generating system, wherein a Stirling engine that again comprises four cylinders 61 to 64 is combined with disk collectors 77, 78 for absorbing the incident solar radiation. Also in this example embodiment, the pistons 65 to 68 of the four cross-shape arranged cylinders 61 to 64 again act on a centrally arranged cross-gear drive 75 that is located in a housing 76. While the regenerators 71, 72 as well as the coolers 69, 70 are constructed analogously to the above described arrangement, the heaters 73, 74 are coupled with the already mentioned disk collectors 77, 78. The construction of such a disk collector is shown in FIGS. 9 and 10.

As can be seen, the incident solar radiation shown by arrows is absorbed by the disk-shaped collector surfaces 80 that are arranged on a tube 79 through which the working gas flows, whereby the energy of the solar radiation is transferred into the working gas. The successive collector disks have a respective increasing diameter and are arranged with respective increasing spacing distances therebetween, as shown in FIG. 10, to achieve an optimum energy collection.

The entire arrangement is finally surrounded by a fusion heat reservoir 81 in the form of a cylinder that is open at one end. The fusion heat reservoir 81 consists of a plurality of tubes 82 that are arranged in a ring shape and that are filled with a meltable salt or a silver-tin alloy, and that act as a heat reservoir. The use of such a fusion heat reservoir is especially sensible in terrestrial solar energy generating systems and in space stations flying at a low earth orbit, in order to be able to balance-out short-term power variations, that are caused by the earth's shadow or by clouds. An insulating jacket 84 is arranged on the outer side of the fusion heat reservoir 81 as well as underneath a base plate 83 carrying the tubes 82, in order to further increase the efficiency of the arrangement. The same purpose is served by a radiation trap 85 that is arranged between the heaters 73, 74 in the present embodiment.

Finally, the figures do not show the use of heat pipes for removing the waste heat arising in the respectively employed Stirling engines in the above described arrangements. The following line 23, insert a new paragraph as follows: Although the invention has been described with reference to specific example embodiments, it will be appreciated that it is intended to cover all modifications and equivalents within the scope of the appended claims.

I claim:

1. An energy generating system comprising a Stirling engine and a radiant heat absorber arrangement coupled to said Stirling engine, wherein said Stirling engine includes a plurality of heaters, wherein said heat absorber arrangement comprises a tubular heat exchanger that is arranged to receive radiant energy and that comprises a plurality of tubes arranged to form a spiral flow pattern, and wherein said plurality of heaters is combined together to form said tubular heat exchanger.

2. The energy generating system of claim 1, wherein said tubular heat exchanger has an umbrella-like shape substantially corresponding to at least a portion of a sphere, and is arranged surrounding said Stirling engine.

3. The energy generating system of claim 1, further comprising a funnel-shaped radiation trap arranged to direct incident radiant energy onto said tubular heat exchanger.

4. The energy generating system of claim 1, further comprising a partial spherical radiant energy concentrator, wherein said tubular heat exchanger is arranged at a center of said concentrator.

5. An energy generating system comprising a Stirling engine and a radiant heat absorber arrangement coupled to said Stirling engine, wherein said Stirling engine includes a plurality of heaters, and said heat absorber arrangement comprises a plurality of disk collectors connected with said heaters.

6. The energy generating system of claim 5, wherein said Stirling engine comprises four working cylinders arranged in a cross-pattern, and four pistons arranged respectively in said four cylinders.

7. The energy generating system of claim 6, further comprising a cross-wheel gearing arranged centrally between said working cylinders and connected with said pistons.

8. The energy generating system of claim 5, wherein said disk collectors each respectively comprise a tube and a plurality of disk-shaped radiant energy absorbers having different diameters arranged in successive increasing diameter order along said tube with an increasingly greater spacing distance between successively larger adjacent ones of said energy absorbers.

9. The energy generating system of claim 5, wherein said plurality of disk collectors is arranged in a conical shape surrounding said Stirling engine.

10. The energy generating system of claim 1, further comprising a fusion heat reservoir, wherein said disk collectors are arranged within and surrounded by said fusion heat reservoir.

11. The energy generating system of claim 1, wherein said Stirling engine comprises four working cylinders arranged in a cross-pattern, and four pistons arranged respectively in said four cylinders.

12. The energy generating system of claim 11, further comprising a cross-wheel gearing arranged centrally between said working cylinders and connected with said pistons.

13. The energy generating system of claim 12, further comprising an electrical generator and a magnetic coupling connecting said electrical generator with said cross-wheel gearing.

14. The energy generating system of claim 1, wherein said system has a modular construction.

15. An energy generating system comprising a Stirling engine including a plurality of working cylinders arranged around a central axis, a respective piston arranged in each of said cylinders so as to divide each of said cylinders into a hot chamber and a cold chamber, a respective cooler and a respective regenerator and a respective heater arranged in successive flow communication between said cold chamber of each respective one of said cylinders and said hot chamber of a next adjacent one of said cylinders, wherein each said heater comprises a plurality of flow-parallel heat exchange tubes arranged and adapted to receive incident radiant energy and grouped substantially in a respective one of a plurality of spherical sectors corresponding to said plurality of working cylinders.

16. The energy generating system of claim 15, wherein said heat exchange tubes of said heaters together form a tubular heat exchanger having a substantially hemispherical bowl shape that substantially surrounds said regenerators, said coolers, and said cylinders of said Stirling engine from one side.

17. The energy generating system of claim 16, wherein said heat exchange tubes extend in a spiral pattern in said bowl-shaped heat exchanger.

18. The energy generating system of claim 15, further comprising a plurality of substantially disk-shaped radiant energy collectors mounted on each of said heat exchange tubes, and wherein said heat exchange tubes together form a tubular heat exchanger having a substantially conical shape with said regenerators, said coolers, and said cylinders of said Stirling engine arranged substantially within said conical shape of said heat exchanger.

19. The energy generating system of claim 15, further comprising a funnel-shaped radiation trap arranged with a narrower end thereof directed toward said heat exchange tubes.

20. The energy generating system of claim 15, further comprising a fusion heat reservoir in the form of a cylindrical shell arranged coaxially around said Stirling engine.

* * * * *

UNITED STATES PATENT AND TRADEMARK OFFICE
CERTIFICATE OF CORRECTION

PATENT NO. : 5,735,123
DATED : Apr. 7, 1998
INVENTOR(S) : Ehrig

It is certified that error appears in the above-identified patent and that said Letters Patent is hereby corrected as shown below:

On the title page:

under [56] References Cited,
FOREIGN PATENT DOCUMENTS,
following line 2, insert the following References:

| | | |
|---|---|---|
| --2,151,011 | 7/1985 | Great Britain |
| 3,608,797 | 10/1987 | Germany |
| 0,332,267 | 9/1989 | Europe |
| 3,834,071 | 4/1990 | Germany |
| 3,907,768 | 9/1990 | Germany--; |

Col. 2, line 49, after "the" replace "drawings" by --drawings,--;

Col. 5, line 8, after "ments." delete "The following line 23, insert a new paragraph as";

line 9, before "Although" delete "follows:";

Col. 6, line 1, after "claim" replace "1," by --9,--.

Signed and Sealed this

Eighth Day of September, 1998

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,735,123
DATED : Apr. 7, 1998
INVENTOR(S) : Ehrig

It is certified that error appears in the above-identified patent and that said Letters Patent is hereby corrected as shown below:

On the title page,
under [73] Assignee, line 1, after "Aerospace" replace "Airbus" by --AG--;
line 2, before "Germany" replace "GmbH, Hamburg," by --München,--;

Signed and Sealed this

Tenth Day of November 1998

Attest:

Attesting Officer

BRUCE LEHMAN
Commissioner of Patents and Trademarks